UNITED STATES PATENT OFFICE.

PAUL R. HERSHMAN, OF CHICAGO, ILLINOIS.

PRODUCING ALUMINATE FROM ALUNITE.

1,191,104.　　　　Specification of Letters Patent.　　Patented July 11, 1916.

No Drawing.　　Application filed January 18, 1916.　Serial No. 72,689.

*To all whom it may concern:*

Be it known that I, PAUL R. HERSHMAN, a citizen of the Empire of Austria-Hungary, residing in Chicago, county of Cook, State of Illinois, have invented certain new and useful Improvements in Producing Aluminate from Alunite; and I do hereby declare the following to be a full, clear, and exact description of the invention, such as will enable others skilled in the art to which it appertains to make and use the same.

My invention relates to the treatment of alunite and to the recovery therefrom of potassium aluminate, and alumina, in an alkali-soluble form.

In the manufacture of potassium compounds and alumina from alunite, as heretofore practised, the alunite is calcined at temperatures of about 700–1200° C. Potassium sulfate and alumina are formed; and the product is then extracted with water, leaving the alumina as residue, together with the impurities originally contained in the alunite, such as iron and silica.

I have found that when the alunite is mixed with a suitable amount of oxids from the group of alkaline earths, such as calcium oxid, and heated to temperatures from 1000° C. to preferably 1200° C., (but in no case exceeding 1400° C.) and particuarly when certain fluxes such as sodium chlorid are mixed with the charge, or, when the reaction is assisted by superheated steam, a portion of the alumina contained in the alunite combines with the potassium oxid contained therein, forming a water-soluble aluminate, the proportion in which the two combine being one molecule of alumina to one molecule of potassium oxid. The potassium aluminate solutions obtained are free from even traces of silica. In addition, the alumina which has not been converted into aluminate is, through this heating process, converted into an alkali-soluble form. After the completion of the reaction, only traces of sulfuric acid or sulfids are found in the product obtained.

Most of the calcium oxid used is found in its original form, after the completion of the reaction, instead of in the form of calcium sulfate, so that it would seem that any calcium sulfate which might be formed as an intermediate product is immediately decomposed, although the decomposition of pure calcium sulfate, according to the literature, would not take place at such low temperatures.

When alunite is heated alone, no aluminate is formed below 1000° C., and but a small percentage above that temperature. The addition of calcium oxid, however, in all cases, is found to increase materially the formation of soluble alumina and aluminate, and under the most favorable conditions all the potassium contained in the raw alunite as sulfate gives up its contents of sulfuric acid and combines with such part of the alumina as corresponds to the proportion: one molecule $K_2O$ to one molecule $Al_2O_3$. If, now, in addition to the compounds added to cause the conversion of all the potassium oxid contained into potassium aluminate (calcium oxid and flux), such an amount of alkaline potassium salts, or potassium sulfate and carbon is added, as is necessary to combine with the surplus of alumina (*i. e.*, that part of the alumina which does not combine with the potassium oxid from the potassium sulfate of the alunite) in the proportion of one molecule of potassium oxid to one molecule of the surplus alumina, then the alumina contained in the alunite can be converted into aluminate with substantially quantitative yields.

It has been mentioned above that the potassium aluminate solution obtained by dissolving the potassium aluminate (produced from the potassium originally contained in the raw alunite) is free of silica. Furthermore, if the washed residue, consisting of the surplus of alumina and the impurities, is heated with alkali, the solutions obtained are found to be practically free from silica, probably because the latter has, during the heating process, been converted into alkali-insoluble calcium silicate. This is a great advantage, no loss of alkali being caused by the combining with alkali-soluble silica.

The invention will be further illustrated by the following specific instances of its application:

Example 1: 100 parts by weight of finely pulverized crude basic alunite (such as is found in large deposits in Utah) are mixed with 10 parts by weight of salt and 15 parts by weight of calcium oxid and heated in a muffle furnace at 1200° C. for two hours. The product obtained is treated, preferably under pressure of 150 to 175 pounds per square inch, with hot water of a corresponding temperature, although the use of pressure is not absolutely essential. The potassium aluminate formed is thus brought into solution, and the residue, after being well washed with water and freed of potassium aluminate consists of alkali-soluble alumina and all the impurities, but is substantially free from potassium compounds, either water-soluble or water-insoluble. The alumina is then extracted by a boiling solution of an alkali in amount sufficient to dissolve the alumina, the employment of pressure facilitating the extraction. and reprecipitated by any of the well-known methods, the sodium aluminate solution obtained during the process being practically free of silica.

Example 2: 100 parts by weight of raw alunite are mixed with 15 parts by weight of lime (CaO), 60 parts by weight of potassium sulfate, and 15 parts of carbon; this mixture is heated to 1150° C. for half an hour in the presence of steam. The product obtained is treated, preferably under pressure of 150 to 175 pounds, with four parts of water for each part of potassium aluminate formed during the calcination, and the alumina and potassium compounds are separated as above.

Example 3: 100 parts by weight of calcined alunite are mixed with 15 parts by weight of lime (CaO) and 50 parts by weight of potassium carbonate, and kept at 1150° C. for one hour. The product obtained is then treated with water as per Example 2.

It will of course be understood that many changes of minor importance can be made in the invention as described, without departing from its spirit and scope. For instance, instead of potassium compounds, sodium salts may be employed, etc.

I claim:

1. The method of producing potassium aluminate from alunite, which comprises treating the raw alunite at temperatures not exceeding 1400° C. with an oxid of an alkaline earth, and subsequently dissolving out the potassium aluminate from the resulting mass, under pressure; substantially as described.

2. The method of producing potassium aluminate, from alunite, which comprises treating the raw alunite at temperatures not exceeding 1400° C. with an oxid of an aklaline earth and with a flux, and subsequently dissolving out the potassium aluminate from the resulting mass under pressure; substantially as described.

3. The method of producing potassium aluminate from alunite, which comprises treating the raw alunite at temperatures not exceeding 1400° C. with an oxid of an alkaline earth and with superheated steam, and subsequently dissolving out the potassium aluminate from the resulting mass under pressure; substantially as described.

4. The method of producing potassium aluminate from alunite, which comprises treating the raw alunite at temperatures not exceeding 1400° C. with an oxid of an alkaline earth, a flux, and superheated steam, and subsequently dissolving out the potassium aluminate from the resulting mass under pressure; substantially as described.

5. The method of recovering the alkali-insoluble alumina contained in alunite in an alkali-soluble form, which comprises treating the alunite at temperatures not exceeding 1400° C. with an oxid of an alkaline earth, and treating the resulting mass with a solution of an alkali in amount sufficient to combine with the excess of alumina, i. e., that part of the alumina which does not combine with the potassium oxid from the potassium sulfate in the alunite; substantially as described.

6. The method of recovering the alumina contained in alunite in a water-soluble form, which comprises treating the alunite at temperature not exceeding 1400° C. with an oxid of an alkaline earth and with a sufficient quantity of alkali to combine with the excess of alumina, i. e. that part of the alumina which does not combine with the potassium oxid from the potassium sulfate in the alunite and dissolving out the water-soluble aluminum compounds from the calcine; substantially as described.

7. The method of making the silicon compounds contained in raw alunite insoluble in water or alkali, which comprises treating the raw alunite at temperatures not exceeding 1400° C. with an oxid of an alkaline earth; substantially as described.

8. The method of producing potassium sulfate from alunite, which comprises treating the raw alunite at temperatures not exceeding 1400° C. with an oxid of an alkaline earth together with an alkali sulfate; substantially as described.

In testimony whereof I affix my signature, in presence of two witnesses.

PAUL R. HERSHMAN.

Witnesses:
 OSCAR LAAGE, Jr.,
 K. MANEY.